US012665252B2

(12) United States Patent
Lee et al.

(10) Patent No.: US 12,665,252 B2
(45) Date of Patent: Jun. 23, 2026

(54) BATTERY PACK

(71) Applicant: SK ON CO., LTD., Seoul (KR)

(72) Inventors: Seung Hun Lee, Daejeon (KR); Tae Gu Lee, Daejeon (KR); Ji Hoon Lim, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 645 days.

(21) Appl. No.: 18/181,548

(22) Filed: Mar. 10, 2023

(65) Prior Publication Data

US 2023/0291059 A1     Sep. 14, 2023

(30) Foreign Application Priority Data

Mar. 14, 2022     (KR) ........................ 10-2022-0031402

(51) Int. Cl.
*H01M 50/289*     (2021.01)
*H01M 50/204*     (2021.01)
*H01M 50/271*     (2021.01)
*H01M 50/367*     (2021.01)
*H01M 50/383*     (2021.01)

(52) U.S. Cl.
CPC ....... *H01M 50/289* (2021.01); *H01M 50/204* (2021.01); *H01M 50/271* (2021.01); *H01M 50/367* (2021.01); *H01M 50/383* (2021.01)

(58) Field of Classification Search
CPC ................................................. H01M 50/271
See application file for complete search history.

(56) References Cited

U.S. PATENT DOCUMENTS

| | | | |
|---|---|---|---|
| 2012/0214025 A1 | 8/2012 | Moon et al. | |
| 2015/0303422 A1* | 10/2015 | Poller | H01M 50/171 |
| | | | 429/54 |
| 2018/0108892 A1 | 4/2018 | Kim et al. | |
| 2021/0402884 A1* | 12/2021 | Wang | H01M 50/358 |

(Continued)

FOREIGN PATENT DOCUMENTS

| | | |
|---|---|---|
| EP | 3279970 A1 | 2/2018 |
| EP | 3965221 A1 | 3/2022 |

(Continued)

OTHER PUBLICATIONS

Extended European Search Report for the European Patent Application No. 23161372.0 issued by the European Patent Office on Aug. 7, 2023.

(Continued)

*Primary Examiner* — Gregg Cantelmo
(74) *Attorney, Agent, or Firm* — IP & T GROUP LLP

(57) ABSTRACT

A battery pack includes a cell assembly; and a pack case accommodating the cell assembly in an internal space, wherein the pack case includes a lower plate having a plate shape and a frame disposed to protrude upwardly from the lower plate, wherein the frame has an inlet through which flame flows from the cell assembly into the internal space of the frame, and a flow path through which the flame flowing in from the inlet flows, wherein the flow path is formed by a partition wall disposed in the length direction of the frame, and wherein at least two or more of the partition walls are spaced apart from each other in the height direction of the frame such that a direction of the flow path is able to be changed.

13 Claims, 5 Drawing Sheets

(56)            References Cited

U.S. PATENT DOCUMENTS

2022/0263189  A1*    8/2022   Ko  ..................... H01M 50/264
2022/0393298  A1    12/2022   Shin et al.

FOREIGN PATENT DOCUMENTS

KR      10-2012-0094707  A      8/2012
KR      10-2017-0044473  A      4/2017
KR            112310519  A      2/2021
KR      10-2021-0133536  A     11/2021

OTHER PUBLICATIONS

Office Action for Korean Patent Application No. 10-2022-0031402
issued by the Korean Patent Office on Jan. 16, 2026.

* cited by examiner

BATTERY PACK

CROSS-REFERENCE TO RELATED APPLICATION(S)

This application claims benefit of priority to Korean Patent Application No. 10-2022-0031402 filed on Mar. 14, 2022 in the Korean Intellectual Property Office, the disclosure of which is incorporated herein by reference in its entirety.

BACKGROUND

1. Field

The present disclosure relates to a battery pack.

2. Description of Related Art

Currently commercialized secondary batteries may include a nickel cadmium battery, a nickel hydrogen battery, a nickel zinc battery, and a lithium secondary battery. Among such batteries, a lithium secondary battery may not have a memory effect as compared to a nickel-based secondary battery, such that a lithium secondary battery may be easily charged and discharged, a self-discharge rate thereof may be relatively low, and energy density thereof may be relatively high.

A secondary battery has been widely used in medium and large-sized devices such as automobiles and power storage devices, and a large number of secondary batteries may be electrically connected and used in such medium-large-sized devices to increase capacity and output. Also, a plurality of secondary batteries may form a battery pack by being accommodated in a pack case.

Various characteristics may be required for such a battery pack, and a typical characteristic may be stability. Moreover, stability of a battery pack installed in a vehicle may be important because stability of a battery pack may be directly related to lives of occupants.

One of the important problems related to stability of the battery pack may be direct exposure to flame. It may be a top priority to prevent fire in a battery pack, but in some cases, fire may occur in the battery pack. In this case, when a large amount of flames or high-temperature gas is exposed to the outside of the battery pack, the exposed flames or high-temperature gas may damage other components around the battery pack, and may also lead to secondary ignition. In particular, when a fire occurs in a battery pack installed in a vehicle, the generated fire may be a very dangerous factor to occupants. Also, when the battery pack is mounted on a hybrid vehicle or collides with another vehicle, when a fuel storage tank is exposed to flames or high-temperature gas, the fuel may explode, leading to a serious accident.

Accordingly, it may be necessary to develop a battery pack structure capable of preventing flames exposure to the outside of the battery pack.

SUMMARY

An aspect of the present disclosure is to provide a battery pack which may prevent exposure of flames.

According to an aspect of the present disclosure, a battery pack includes a cell assembly; and a pack case accommodating the cell assembly in an internal space, wherein the pack case includes a lower plate having a plate shape and a frame disposed to protrude upwardly from the lower plate, wherein the frame has an inlet through which flame flows from the cell assembly into the internal space of the frame, and a flow path through which the flame flowing in from the inlet flows, wherein the flow path is formed by a partition wall disposed in the length direction of the frame, and wherein at least two or more of the partition walls are spaced apart from each other in the height direction of the frame such that a direction of the flow path is able to be changed.

The partition wall may be disposed such that flowing flames may be diverted at least twice.

The partition wall may include a first partition wall disposed below the inlet, a second partition wall disposed below the first partition wall, and a separation partition wall disposed in a height direction of the frame for separation from neighboring flow paths.

An end of the first partition wall may be spaced apart from a sidewall of the frame or the separation barrier to form a first connection flow path through which flames flow toward a lower side of the frame, and an end of the second partition wall may be spaced apart from a sidewall of the frame or the separation partition wall to form a second connection flow path disposed in a direction opposite to the first connection flow path in the length direction of the frame.

Flames flowing in through the inlet may be guided along an upper surface of the first partition wall, may flow in the length direction of the frame, may flow downwardly through the first connection flow path, and may flow in the length direction of the frame through a first flow path formed by the first partition wall and the second partition wall, and, on the end of the first flow path, flames may flow downwardly through the second connection flow path, may be guided through the lower surface of the second partition wall and may flow along the second flow path.

A plurality of the inlets may be spaced apart from each other in the length direction of the frame.

Flames flowing in through the plurality of inlets may be separated from each other and may flow through the first connection flow path, the first flow path, and the second connection flow path forming separate flow paths, and flames may flow through the second flow path forming a flow path.

A plurality of cell assemblies may be provided, and a partition wall may be disposed between the plurality of cell assemblies to separate the plurality of cell assemblies from neighboring cell assemblies.

Cell covers may be provided above and below the plurality of cell assemblies to cover the cell assemblies.

The frame may include a venting bracket inserted into a coupling groove provided in a separation wall of the cell assembly.

The venting bracket may protrude to an inner side of the frame to seal neighboring spaces, and the venting bracket may guide the cell assembly when the cell assembly is coupled.

The venting bracket may include a coupling protrusion inserted into a coupling groove provided in a separation wall of the cell assembly.

The pack case may further include a cover member coupled to the frame to cover an upper portion of the frame.

The frame may further include a first frame in which the inlet is formed and a second frame connected to the first frame.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
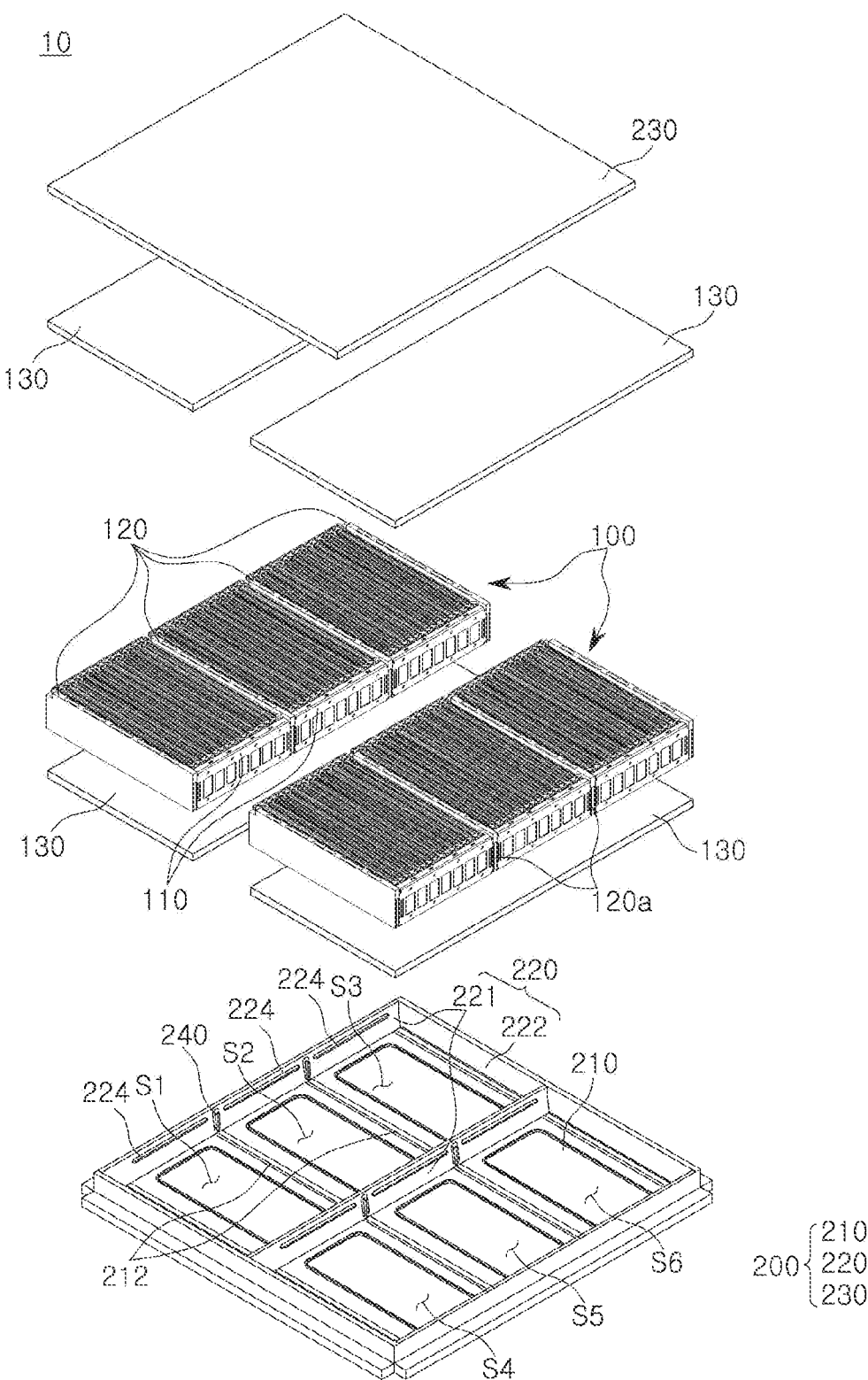
FIG. 1 is a perspective diagram illustrating a configuration of a battery pack according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

An expression used in the singular encompasses the expression of the plural, unless it has a clearly different meaning in the context.

In example embodiments, terms such as an upper side, an upper portion, a lower side, a lower portion, a side surface, a front surface, a rear surface, or the like, are represented based on the directions in the drawings, and may be used differently if the direction of an element is changed.

FIG. 1 is a perspective diagram illustrating a configuration of a battery pack according to an example embodiment.

Referring to FIG. 1, a battery pack 10 in an example embodiment may include a cell assembly 100 and a pack case 200.

The cell assembly 100 may include a secondary battery. Here, the secondary battery may be implemented as a pouch type secondary battery, but an example embodiment thereof is not limited thereto.

The secondary battery may include an electrode assembly, an electrolyte solution, and an exterior material. Here, the electrode assembly may be an assembly of an electrode and a separator, and may be configured in a form in which one or more positive electrode plates and one or more negative electrode plates may be disposed with a separator interposed therebetween. Also, an electrode tab may be provided on each electrode plate of the electrode assembly and may be connected to an electrode lead. In a pouch-type secondary battery, one or more electrode tabs may be connected to an electrode lead, and the electrode lead may be interposed between pouch exterior materials and one end thereof may be exposed to the outside, thereby functioning as an electrode terminal. The exterior material may have an empty space therein and may accommodate the electrode assembly and the electrolyte, and may be configured in a sealed form. The exterior material may be formed of a metal material in a can-type secondary battery, and may include an external insulating layer, a metal layer, and an internal adhesive layer in a pouch-type secondary battery.

A plurality of the secondary battery may be provided in the cell assembly 100. For example, the cell assembly 100 may include a plurality of pouch-type secondary batteries. In this case, the pouch-type secondary batteries may be stacked in at least one direction. For example, the pouch-type secondary battery may be configured in a form in which two wide surfaces may be disposed on the left and right sides, respectively, and may be erected substantially perpendicular to the ground. Also, a plurality of the secondary batteries standing as above may be disposed in parallel in a horizontal direction in a form in which wide surfaces may oppose each other.

Also, a plurality of the cell assemblies 100 may be included in the battery pack 10. That is, a plurality of cell assemblies 100 may be included in a pack case 200, and the plurality of cell assemblies 100 may be disposed in a vertical direction. However, an example embodiment thereof is not limited thereto, and the plurality of cell assemblies 100 may be disposed in a horizontal direction. Also, the plurality of cell assemblies 100 may be connected in series and/or parallel to each other through the end plate 110.

A partition wall 120 for separating neighboring cell assemblies 100 may be disposed between the plurality of cell assemblies 100, and the partition wall 120 may also be disposed on the side surface of the outermost cell assembly 100 to separate the cell assembly 100 from the outside. The partition wall 120 may include a coupling groove 120a coupled to a venting bracket 240 to be described later. When the plurality of cell assemblies 100 are coupled to the pack case 200, the plurality of cell assemblies 100 may be coupled to a predetermined position while the venting bracket 240 is coupled to the coupling groove 120a.

The cell assembly 100 may include a cell cover 130 disposed to cover upper and lower portions of the plurality of cell assemblies 100. The cell cover 130 may be formed of a metal material such as aluminum, such that each pair of two cell covers may be coupled to the partition wall 120.

The pack case 200 may include, for example, a lower plate 210, a frame 220 and a cover member 230.

The lower plate 210 may be configured in a substantially plate shape and may be disposed below the cell assembly 100 parallel to the ground. For example, the lower plate 210 may have a substantially rectangular plate shape. However, an example embodiment thereof is not limited thereto, and the lower plate 210 may be configured in various forms depending on the structure of a vehicle in which the battery pack 10 is installed. The cell assembly 100 may be seated on the lower plate 210. As an example, an example in which six cell assemblies 100 are seated on the lower plate 210 has been described, but an example embodiment thereof is not limited thereto, and the number of cell assemblies 100 and the size of the lower plate 210 may be varied. The lower plate 210 may include a separator 212 for dividing a region in which the cell assembly 100 is seated together with the frame 220.

The frame 220 may be formed to protrude from the lower plate 210 at a predetermined height in an upward direction. Here, an example in which the space formed in the lower plate 210 and the frame 220 are configured as the first to sixth regions S1 to S6 may be described as an example, but an example embodiment thereof is not limited thereto. For example, the space formed between the lower plate 210 and the frame 220 may include two regions, four regions, eight regions, and eight or more regions. The detailed description of the frame 220 will be described later.

The cover member 230 may be coupled to the frame 220 to cover the upper portion of the frame 220, and may form an internal space together with the lower plate 210 and the frame 220.

Hereinafter, the frame will be described in greater detail with reference to the drawings.

Figure 2:
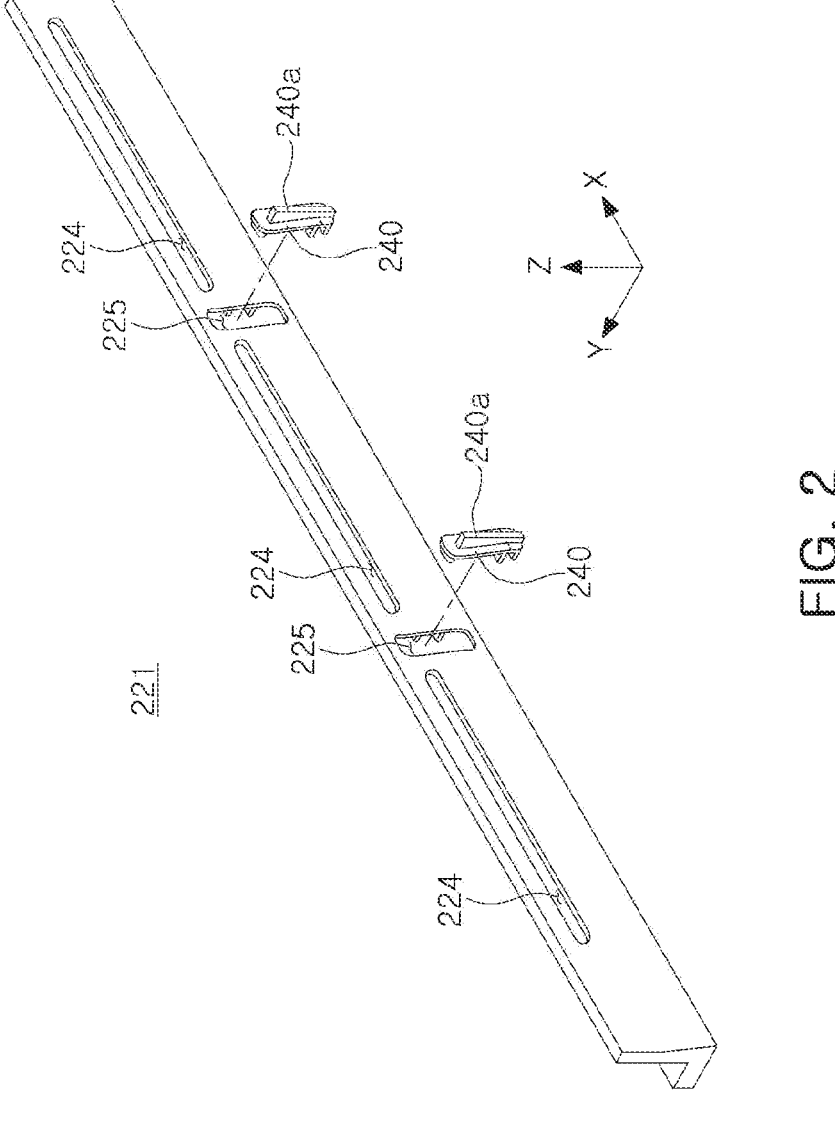
FIG. 2 is a perspective view illustrating a first frame included in a frame according to an example embodiment of the present disclosure.
Figure 3:
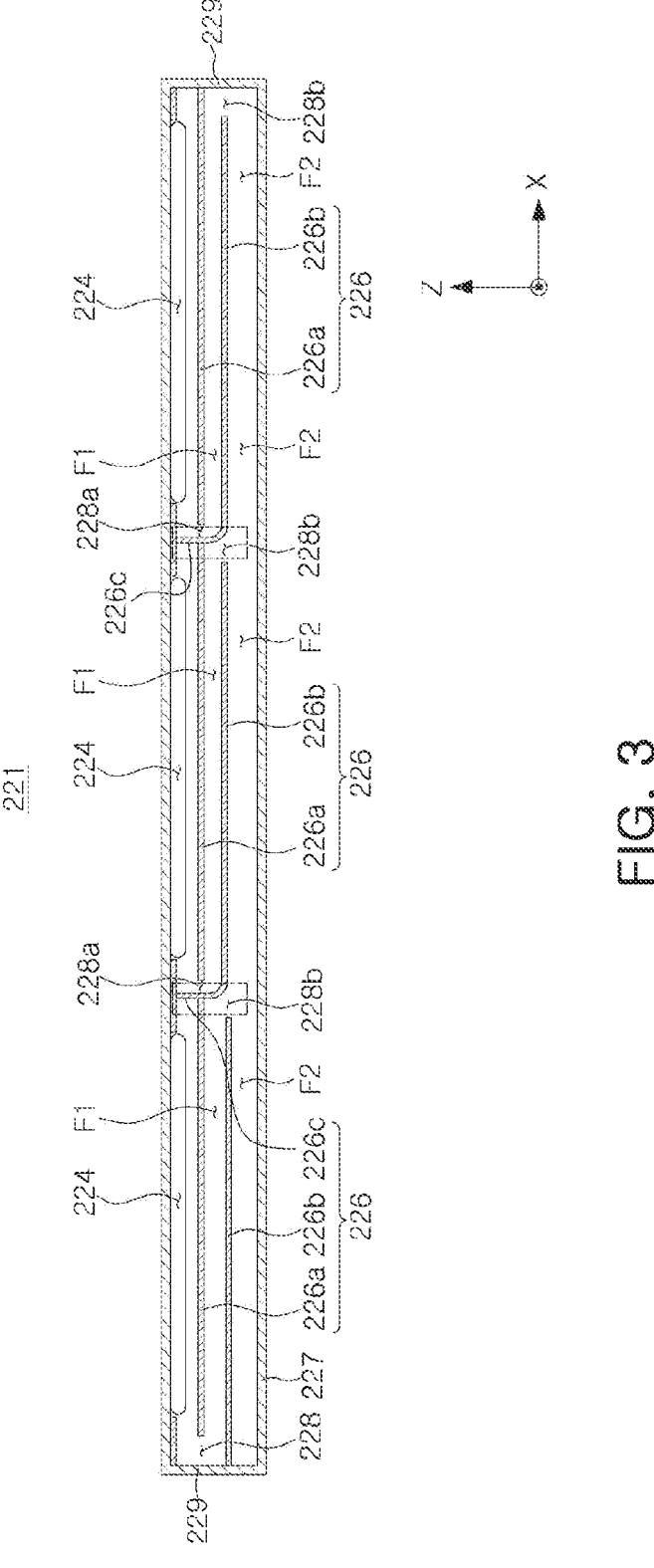
FIG. 3 is a cross-sectional diagram illustrating a flow path provided in a first frame according to an example embodiment of the present disclosure.

FIG. 2 is a perspective view illustrating a first frame included in a frame according to an example embodiment. FIG. 3 is a cross-sectional diagram illustrating a flow path provided in a first frame according to an example embodiment.

Referring to FIGS. 2 and 3, the frame 220 may form an internal space in which a plurality of cell assemblies 100 (see FIG. 1) may be accommodated on the lower plate 210 together with the lower plate 210 (see FIG. 1). Also, the frame 220 may include a first frame 221 having an internal space through which flames flow, and a second frame 222 connected to an end of the first frame 221. Also, the first frame 221 may include a central partition wall having an internal space in which flames flow and partitioning a central portion of the lower plate 210. The first frame 221 may include an inlet 224 such that the flames may flow into the internal space. As an example, three inlets 224 may be spaced apart from each other and may be disposed on an upper end of the first frame 221. A partition wall 226 may be provided in the first frame 221 to form a flow path of the flames flowing into the internal space. The partition wall 226 may include a first partition wall 226a disposed below the inlet 224 and a second partition wall 226b disposed below the first partition wall 226. That is, the first partition wall 226a and the second partition wall 226b may be spaced apart from each other in the height direction of the first frame 221. The partition wall 226 may include a separation barrier 226c for separation from neighboring flow paths. As an example, the separation partition wall 226c may be disposed in the height direction of the first frame 221. The separation partition wall 226c may be connected to one of the adjacent first partition walls 226a and may be spaced apart from the other one. Also, the separation partition wall 226c may be connected to one of the adjacent second partition walls 226b and may be spaced apart from the other one. That is, the separation partition wall 226c may separate flow channels disposed adjacent to each other.

In the first frame 221, a venting bracket 240 may be installed. To this end, the first frame 221 may include a mounting hole 225 into which the venting bracket 240 may be inserted and installed. As an example, the venting bracket 240 may be bonded to the first frame 221 by laser welding. Also, the venting bracket 240 may be disposed to protrude into the first frame 221. The venting bracket 240 may guide the cell assembly 100 when the cell assembly 100 is installed, and may seal spaces adjacent to each other. That is, the venting bracket 240 may guide the cell assembly 100 by being coupled to the coupling groove 120a of the partition wall 120 illustrated in FIG. 1, and to this end, the venting bracket 240 may include a coupling protrusion 240a. Further, the coupling protrusion 240a of the venting bracket 240 may be coupled to the coupling groove 120a of the partition wall 120 illustrated in FIG. 1 and may seal spaces adjacent to each other.

Here, the flow path of the flames may be formed by the lower plate 210 and the frame 220, and flames may flow into the internal space of the first frame 221 through the inlet 224 of the first frame 221 from the internal space in which the cell assembly 100 is accommodated. Thereafter, the flames flowing into the internal space of the first frame 220 may flow along the first partition wall 226a. Thereafter, the flowing flames may flow downwardly through the first connection flow path 228a disposed on the end of the first partition wall 226a. The first connection flow path 228a may be disposed between the first partition 226a and the sidewall 229 of the first frame 221 and between the first partition 226a and the separation partition 226c.

Thereafter, the flames may flow through the first flow path F1 formed by the first partition wall 226a and the second partition wall 226b. Thereafter, the flames may flow downwardly through the second connection flow path 228b disposed on the side opposite to the side on which the first connection flow path 228a is formed and disposed on the end of the second partition wall 226b. The second connection flow path 228a may be disposed between the second partition 226b and the sidewall 229 of the first frame 221 and between the second partition 226b and the separating partition 226c.

Then, the flames may flow through the second flow path F2 formed by the second partition wall 226b and the bottom wall 227. As the flames flow along the flow path, the temperature and pressure of the flames may decrease, such that the size of the flames may be reduced. Accordingly, the flames may be prevented from being discharged to the outside.

The second flow path F2 formed by the second partition wall 226b and the bottom wall 227 may be connected to the second flow path F2 disposed adjacently. However, the flow path of the region in which the first flow path F1 and the inlet 224 are formed may be separated from the flow path of the region in which the first flow path F1 and the inlet 224 are formed and which is disposed adjacently and may form separate flow paths.

Also, the frame 220 may include an outlet (not illustrated) connected to the second flow path F2. The outlets corresponding to the number of second flow paths F2 may be provided in the frame 220. Also, the outlet may be formed in the first frame 221 or may be formed in the second frame 222 connected to the second flow path F2.

Here, the length direction of the first frame 221 may refer to the X-axis direction of FIGS. 2 and 3, and the lower side direction of the first frame 221 and the height direction of the first frame 221 may refer to the Z-axis direction in FIGS. 2 and 3, that is, a direction from the upper surface to the lower surface of the first frame 221.

Figure 4:
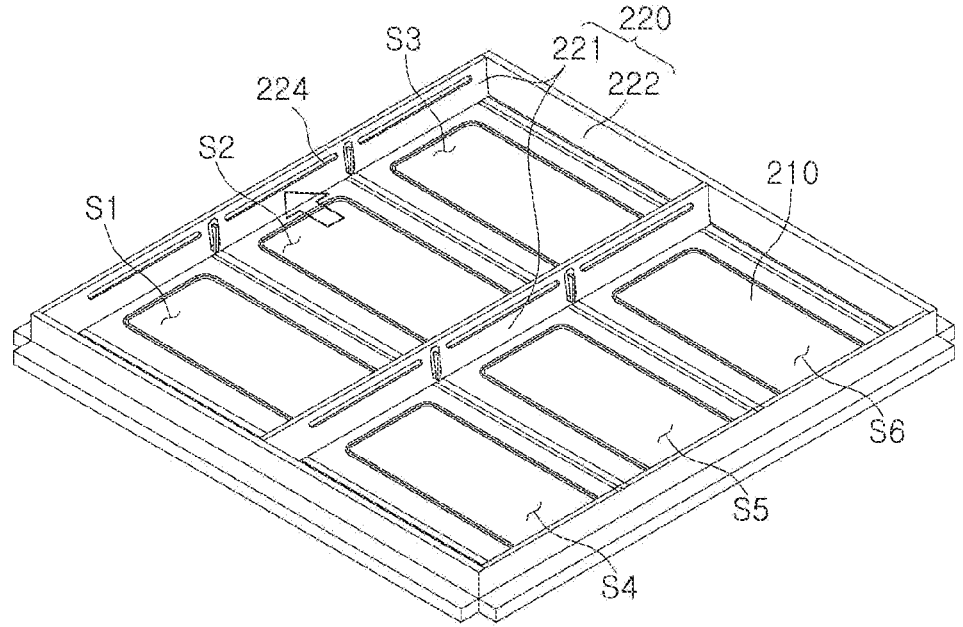
FIGS. 4 to 5 are diagrams illustrating a flow path of a flames flowing along a flow path of a first frame according to an example embodiment of the present disclosure.
Figure 5:
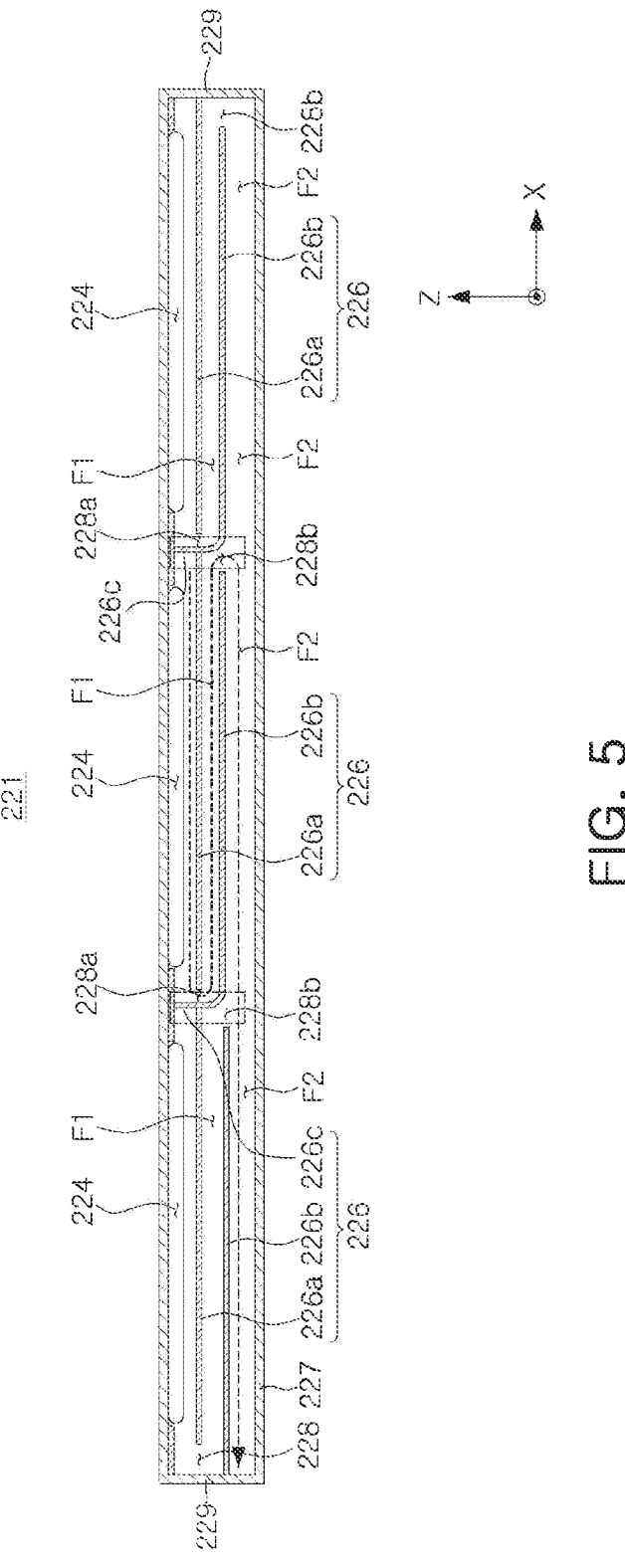

Referring to FIGS. 4 to 5, as for the flow of the flames generated from the cell assembly 100, the space formed in the lower plate 210 and the frame 220 may be configured as first to sixth regions S1 to S6. When flames are generated in the second region S2, the flames may flow into the internal space of the first frame 221 through the inlet 224 disposed in the second region S2. Similarly, when flames are generated in the first and third to sixth regions S1 and S3 to S6, the generated flames may flow into the inner space of the first frame 221 through inlets 224 disposed in the first and third to sixth regions S1 and S3 to S6. The first to sixth regions S1 to S6 may be separated from each other and may form a space not in communication with each other. Accordingly, flames generated in each of the first to sixth regions S1 to S6 may flow into the internal space of the first frame 221 through the inlet 224 disposed in each region. The flames flowing into the internal space of the first frame 221 through the inlet 224 may flow along the first partition wall 226a. Thereafter, the flowing flames may flow downwardly through the first connection flow path 228a disposed on the end of the first partition wall 266a. Thereafter, the flames may flow through the first flow path F1 formed by the first partition wall 226a and the second partition wall 226b. Thereafter, the flames may flow downwardly through the second connection flow path 228b disposed on the side opposite to the side on which the first connection flow path 228a is formed and disposed on the end of the second partition wall 226b. Thereafter, the flames may flow through the second flow path F2 formed by the second partition wall 226b and the bottom wall 227. That is, the flames generated in the first to sixth regions S1 to S6 may be separated and may flow along the first connection flow path 228a, the first flow path F1, and the second connection flow path 228b forming separate flow paths. Thereafter, the flames may be discharged to the outside of the pack case 200 while flowing through the second flow path F2. As the flames may flow along the flow path, the temperature and pressure of the flames may decrease, such that the size of the flames may be reduced. Accordingly, the flames from being discharged to the outside may be prevented. Furthermore, the flames generated in the first to sixth regions S1 to S6 may be separated from each other and may flow along the first connection flow path 228a, the first flow path F1, and the second connection flow path 228b forming separate flow paths, and such that flams may be prevented from being transferred to the cell assembly 100 disposed adjacent thereto.

As described above, when the flames is discharged from the cell assembly 100, the flames flow through the first connection flow path 228a, the first flow path F1, the flow path 228b, and the second flow path F2 formed in the internal space of the first frame 221. By increasing the time during which the flames may flow in the internal space of the first frame 221 and releasing the flames to the outside as above, flames may be prevented from being emitting to the outside.

According to the aforementioned example embodiments, the effect of preventing flames from being exposed to the outside may be obtained.

While the example embodiments have been illustrated and described above, it will be apparent to those skilled in the art that modifications and variations could be made without departing from the scope of the present disclosure as defined by the appended claims.

What is claimed is:
1. A battery pack, comprising:
a cell assembly; and
a pack case accommodating the cell assembly in an internal space,
wherein the pack case includes a lower plate having a plate shape and a frame disposed to protrude upwardly from the lower plate,
wherein the frame has an inlet through which flame flows from the cell assembly into the internal space of the frame, and a flow path through which the flame flowing in from the inlet flows,
wherein the flow path is formed by a plurality of partition walls disposed in a length direction of the frame,
wherein the plurality of partition walls include a first partition wall disposed below the inlet, a second partition wall disposed below the first partition wall, and a separation partition wall disposed in a height direction of the frame for separation from neighboring flow paths, and
wherein the plurality of partition walls are spaced apart from each other in the height direction of the frame such that a direction of the flow path is able to be changed.
2. The battery pack of claim 1,
wherein each of the plurality of partition walls is disposed such that flowing flame is diverted at least twice.
3. The battery pack of claim 1,
wherein an end of the first partition wall is spaced apart from a sidewall of the frame or the separation partition wall to form a first connection flow path through which the flame flows toward a lower side of the frame, and
wherein an end of the second partition wall is spaced apart from a sidewall of the frame or the separation partition wall to form a second connection flow path disposed in a direction opposite to the first connection flow path in the length direction of the frame.
4. The battery pack of claim 3,
wherein the flame flowing in through the inlet is guided along an upper surface of the first partition wall, flows in the length direction of the frame, flows downwardly through the first connection flow path, and flows in the length direction of the frame through a first flow path formed by the first partition wall and the second partition wall, and
wherein, on an end of the first flow path, the flame flows downwardly through the second connection flow path, is guided through a lower surface of the second partition wall and flows along a second flow path.
5. The battery pack of claim 4, wherein the frame includes a plurality of inlets spaced apart from each other in the length direction of the frame.
6. The battery pack of claim 5,
wherein the flame flowing in through the plurality of inlets is separated and flows through the first connection flow path, the first flow path, and the second connection flow path forming separate flow paths, and
wherein the flame flowing through the second flow path which is connected to an outlet of the frame through which the flame is discharged.
7. The battery pack of claim 1,
wherein a plurality of cell assemblies are provided, and
wherein a separation wall is disposed between the plurality of cell assemblies to separate the plurality of cell assemblies from neighboring cell assemblies.
8. The battery pack of claim 7, wherein cell covers are provided above and below the plurality of cell assemblies to cover the plurality of cell assemblies.
9. The battery pack of claim 7, wherein the frame includes a venting bracket inserted into a coupling groove provided in the separation wall of each of the plurality of cell assemblies.
10. The battery pack of claim 9,
wherein the venting bracket protrudes to an inner side of the frame to seal neighboring spaces, and
wherein the venting bracket guides the plurality of cell assemblies when the plurality of cell assemblies are coupled.
11. The battery pack of claim 10, wherein the venting bracket includes a coupling protrusion inserted into a coupling groove provided in the separation wall of each of the plurality of cell assemblies.

12. The battery pack of claim 1, wherein the pack case further includes a cover member coupled to the frame to cover an upper portion of the frame.

13. The battery pack of claim 1, wherein the frame includes a first frame in which the inlet is formed and a second frame connected to the first frame.

\* \* \* \* \*